(12) United States Patent
Gardner

(10) Patent No.: US 9,630,828 B1
(45) Date of Patent: Apr. 25, 2017

(54) MULTI SHOT FLUID DISPENSING SYSTEM

(71) Applicant: Michael A. Gardner, Safety Harbor, FL (US)

(72) Inventor: Michael A. Gardner, Safety Harbor, FL (US)

(*) Notice: Subject to any disclaimer, the term of this patent is extended or adjusted under 35 U.S.C. 154(b) by 0 days.

(21) Appl. No.: 14/286,603

(22) Filed: May 23, 2014

Related U.S. Application Data

(63) Continuation-in-part of application No. 13/624,097, filed on Sep. 21, 2012, now abandoned.

(51) Int. Cl.
| | | |
|---|---|---|
| *A47F 5/00* | (2006.01) | |
| *B65D 1/04* | (2006.01) | |
| *B67D 3/00* | (2006.01) | |
| *A47F 5/08* | (2006.01) | |

(52) U.S. Cl.
CPC ......... *B67D 3/0045* (2013.01); *B67D 3/0038* (2013.01); *B67D 3/0051* (2013.01); *A47F 5/0006* (2013.01); *A47F 5/0815* (2013.01); *A47F 2005/0012* (2013.01)

(58) Field of Classification Search
CPC ............ A47F 2005/0012; A47F 5/0006; A47F 5/0807; A47F 5/0815; F16M 13/00; A47G 25/74; A47G 25/00; G09F 5/042; G09F 5/04; G09F 5/00; B65D 1/04
USPC ............... 215/6, 10, 379–384; 220/550–553; 222/26, 133, 455, 456, 207, 211, 212, 222/213, 465.1; 366/130; D9/523, 516, D9/547; 211/85.3, 113, 57.1, 591, 73, 211/126.16, 72, 87.01, 32; 206/278, 493, 206/466, 45.21, 482; 24/30.5 S; 248/324, 301
See application file for complete search history.

(56) References Cited

U.S. PATENT DOCUMENTS

| | | | | | |
|---|---|---|---|---|---|
| 1,688,985 | A | * | 10/1928 | Person .................... | G09F 5/042 206/476 |
| 1,693,246 | A | * | 11/1928 | Mix ........................ | G09F 5/042 206/371 |
| 2,119,343 | A | * | 5/1938 | Myers .................... | G09F 5/042 206/464 |
| 2,350,275 | A | * | 5/1944 | Eppy ...................... | G09F 5/042 206/294 |
| 2,492,226 | A | * | 12/1949 | Kohl .................... | A47G 25/743 211/113 |

(Continued)

FOREIGN PATENT DOCUMENTS

| | | | | | |
|---|---|---|---|---|---|
| GB | EP0010965 | * | 5/1980 | ............. | B65D 25/52 |

OTHER PUBLICATIONS

Southern Imperial Catalog. pp. 176, 169, 174, and 177. http://www.southernimperial.com. Obtained on Sep. 18, 2015.*

*Primary Examiner* — J. Gregory Pickett
*Assistant Examiner* — Gideon Weinerth

(57) ABSTRACT

A large bottle has a lower region, an upper region, and an intermediate region with a cap removably positioned on the upper region. A small bottle has a lower region, an upper region, and an intermediate region with a cap removably positioned on the upper region. A coupling tube has an upper end and a lower end. The upper end is operatively coupled to the small bottle at the upper region. The lower end is operatively coupled to the large bottle at the lower region. A long web attaches the coupling tube to the large bottle. A short web attaches the coupling tube to the small bottle. A display panel removably receives and supports a plurality of large and small bottles.

2 Claims, 7 Drawing Sheets

(56) References Cited

U.S. PATENT DOCUMENTS

| | | | | |
|---|---|---|---|---|
| 2,598,492 A * | 5/1952 | Boes | | B65D 25/105 206/480 |
| 3,028,013 A * | 4/1962 | Cotey | | A47G 25/74 206/278 |
| 3,298,513 A * | 1/1967 | Krooss | | B65D 71/20 206/192 |
| 3,945,500 A * | 3/1976 | Meckstroth | | A47G 25/743 211/113 |
| 4,422,552 A * | 12/1983 | Palmer | | B65D 73/0021 206/465 |
| 4,483,502 A * | 11/1984 | Fast | | A47F 5/0068 248/223.41 |
| 4,667,827 A * | 5/1987 | Calcerano | | B65D 73/0021 206/461 |
| D292,268 S * | 10/1987 | Costa | | D9/524 |
| 4,997,149 A * | 3/1991 | Koch | | B65F 1/06 220/495.06 |
| 5,358,128 A * | 10/1994 | Belokin | | A47B 73/008 211/75 |
| D356,734 S * | 3/1995 | Orec | | D9/456 |
| 5,405,022 A * | 4/1995 | Rissley | | A47F 5/0006 206/461 |
| 5,692,945 A * | 12/1997 | Crowell | | B01F 13/065 215/3 |
| 5,762,212 A * | 6/1998 | Pomerantz | | A47F 5/0006 206/482 |
| 6,161,707 A * | 12/2000 | Lin | | A47G 25/06 211/32 |
| 6,286,690 B1 * | 9/2001 | Thalenfeld | | A47F 5/0006 211/113 |
| 6,386,379 B1 * | 5/2002 | Battaglia | | A47B 96/00 211/106 |
| 6,966,446 B1 * | 11/2005 | Wise | | A47F 5/0006 206/806 |
| 7,017,759 B1 * | 3/2006 | Friend | | A47B 73/00 211/75 |
| D564,364 S * | 3/2008 | White | | D9/547 |
| 7,467,720 B2 * | 12/2008 | Williquette | | A47F 5/0006 211/113 |
| D641,643 S * | 7/2011 | Jennings | | D9/522 |
| D654,813 S * | 2/2012 | Jennings | | D9/741 |
| 8,641,891 B1 * | 2/2014 | Crowder | | A45F 3/20 210/136 |
| D728,381 S * | 5/2015 | Ferraro | | D9/524 |
| 2004/0262250 A1 * | 12/2004 | Kosir | | A47F 5/0006 211/113 |
| 2005/0006329 A1 * | 1/2005 | Williquette | | A47F 5/0006 211/113 |
| 2005/0268507 A1 * | 12/2005 | Valiulis | | G09F 3/14 40/651 |
| 2013/0306812 A1 * | 11/2013 | Alcolea Magallon | | A47F 5/0006 248/205.1 |
| 2014/0306076 A1 * | 10/2014 | Friesch | | A47G 1/17 248/205.3 |

* cited by examiner

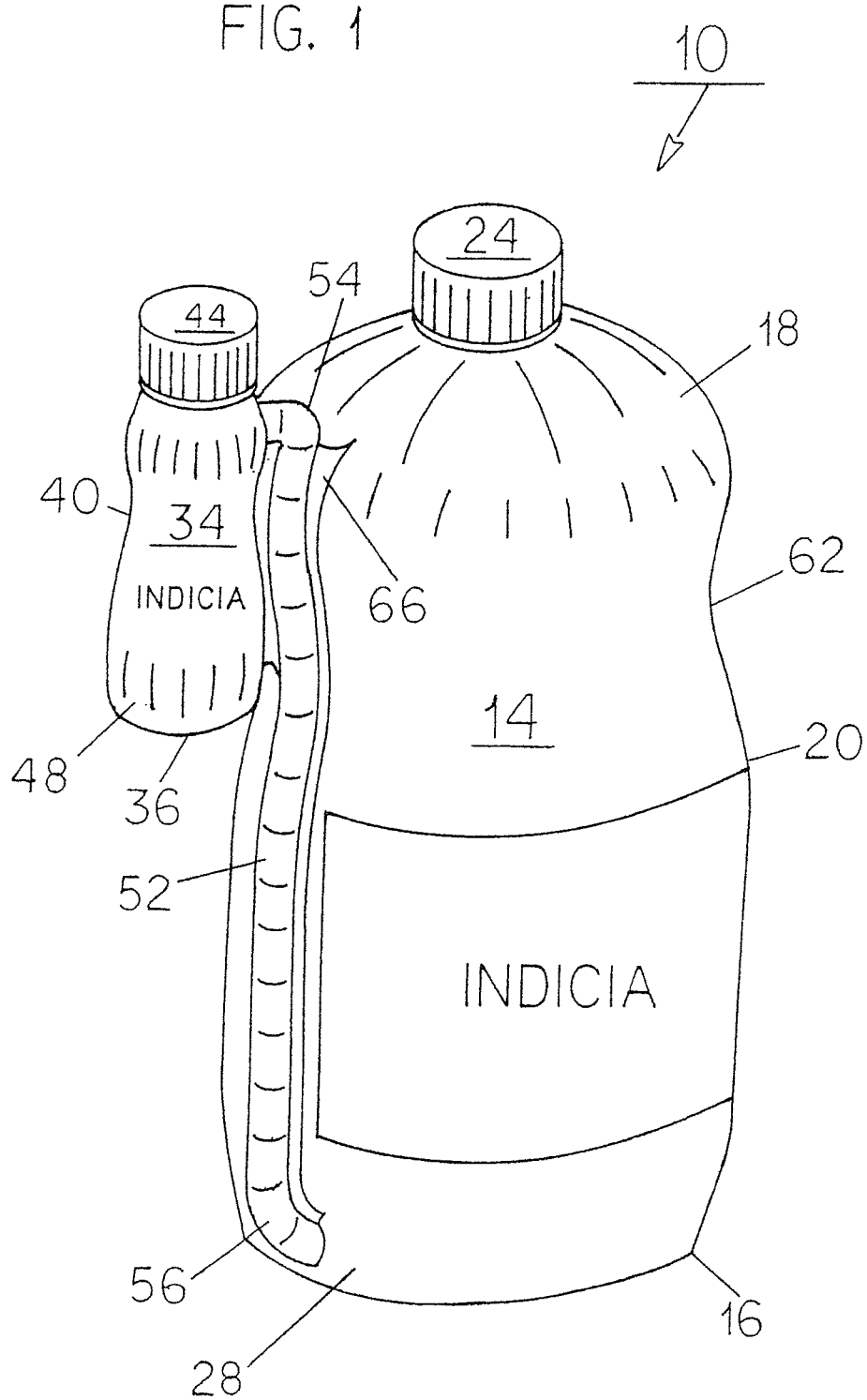

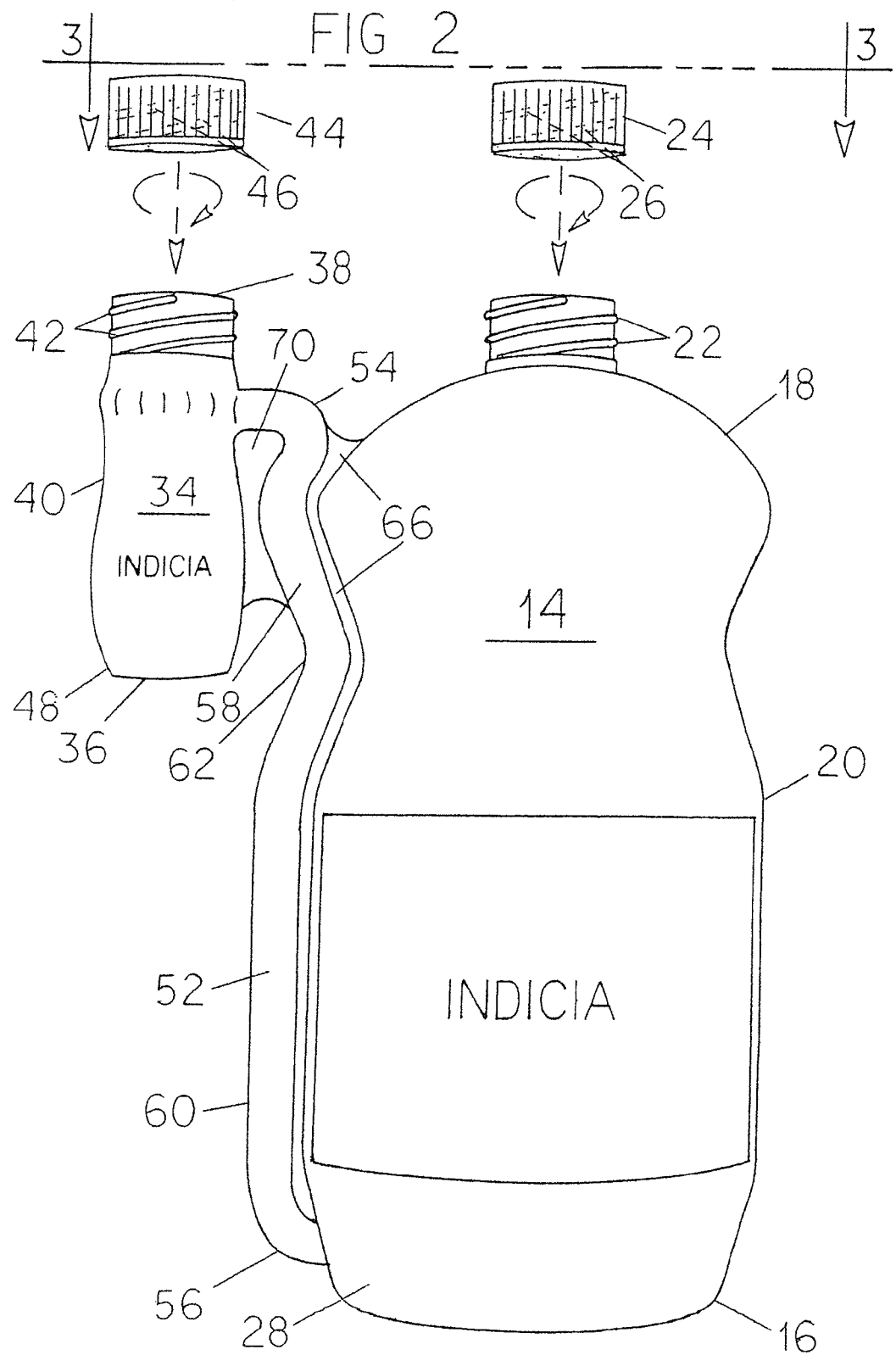

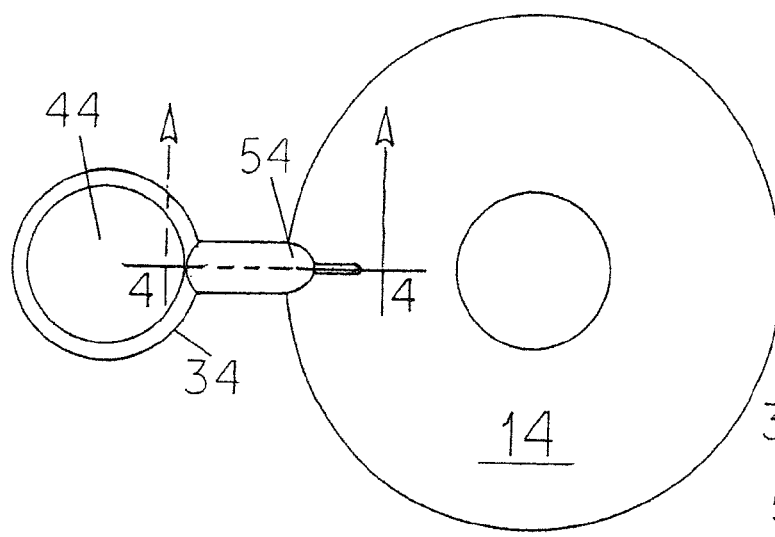
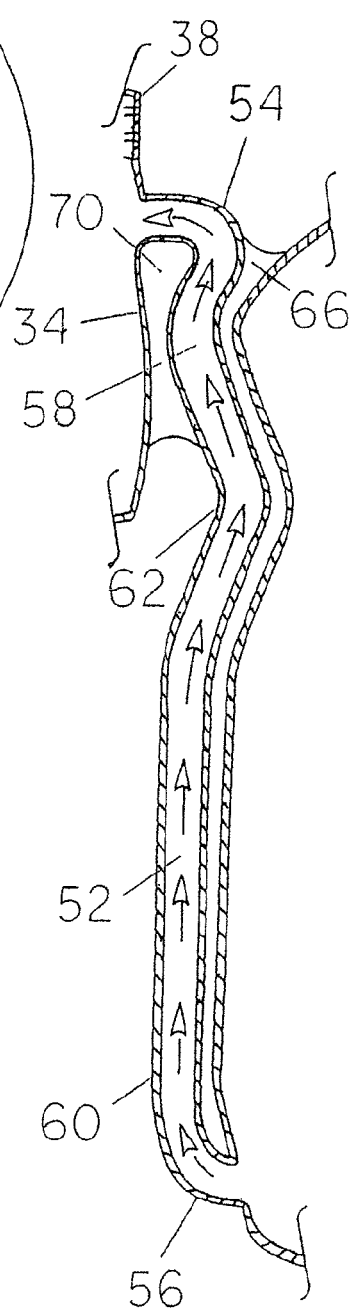

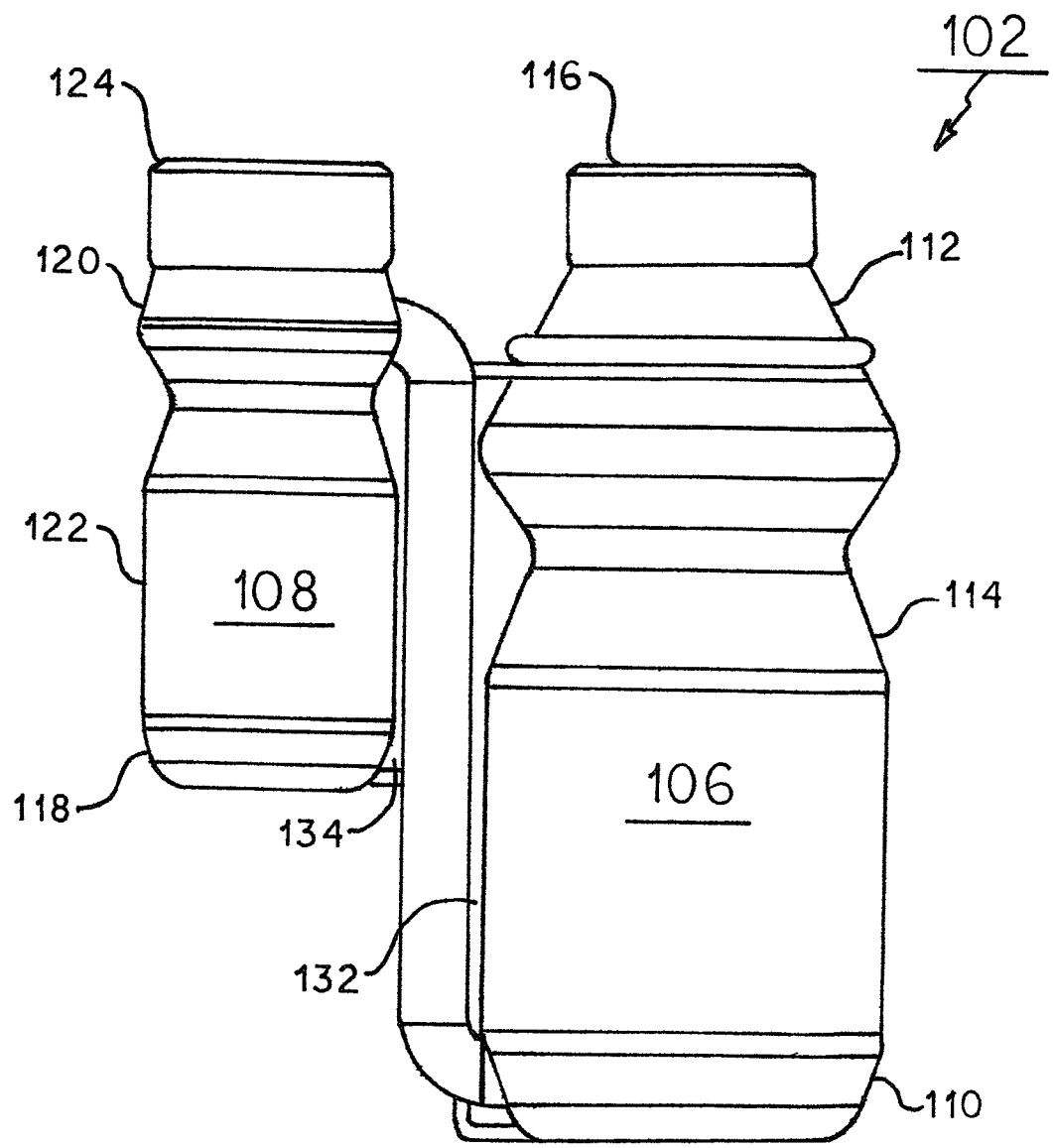

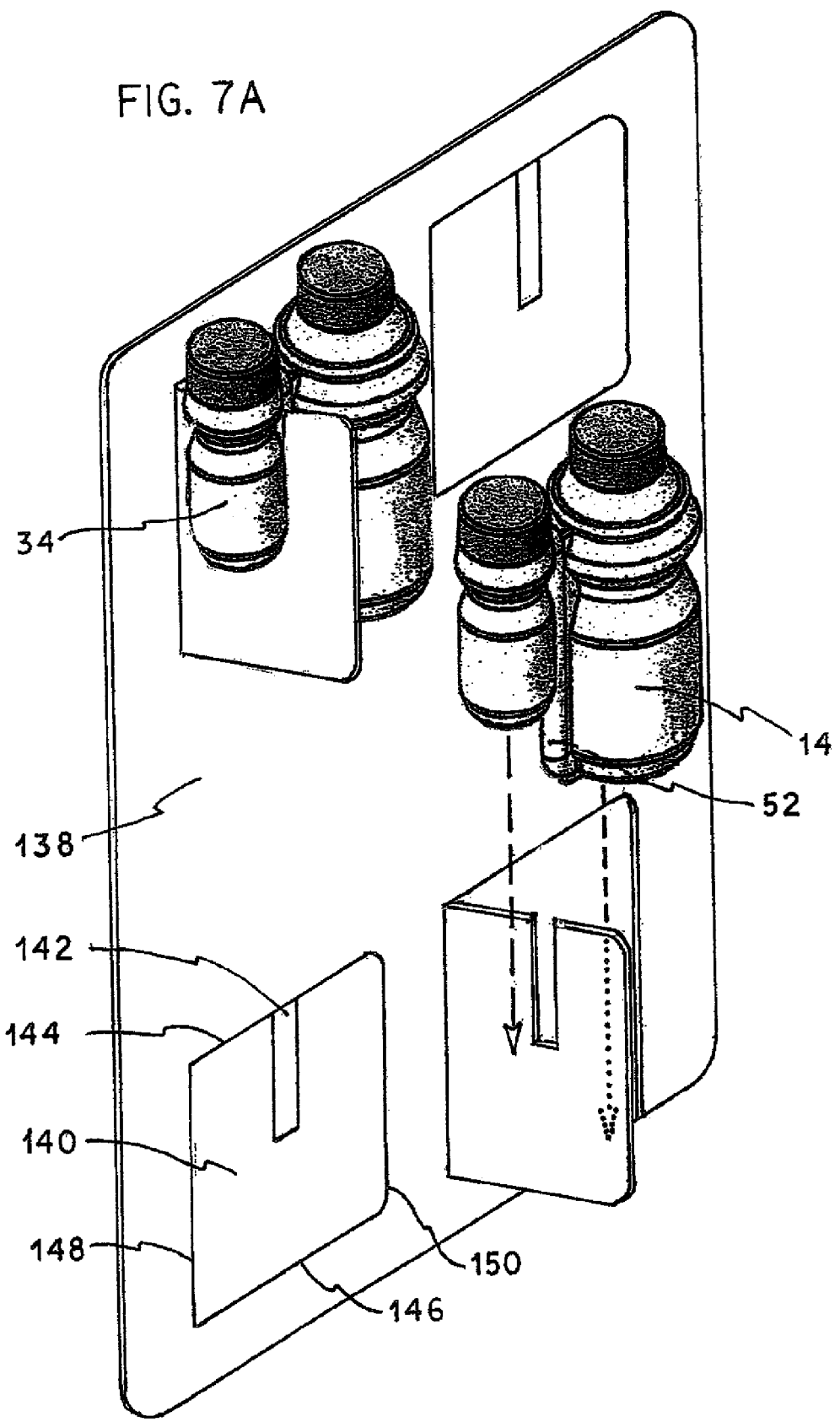

MULTI SHOT FLUID DISPENSING SYSTEM

RELATED APPLICATION

The present application is a continuation-in-part of pending application Ser. No. 13/624,097, the subject matter of which is incorporated herein by reference.

BACKGROUND OF THE INVENTION

Field of the Invention

The present invention relates to a multi shot fluid dispensing system and more particularly pertains to storing a large quantity of fluid, measuring out a precise small quantity of fluid from the large quantity of fluid, and pouring out the precise small quantity of fluid, the storing and measuring and pouring being done in a safe, convenient and economical manner. The present invention also includes a display panel for the removable receipt and support of a plurality of multi shot fluid dispensing systems.

Description of the Prior Art

The use of fluid dispensing bottles of known designs and configurations is known in the prior art. More specifically, fluid dispensing bottles of known designs and configurations previously devised and utilized for the purpose of storing, measuring and pouring a large quantity of fluid are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a multi shot fluid dispensing system that allows storing a large quantity of fluid, measuring out a precise small quantity of fluid from the large quantity of fluid, and pouring out the precise small quantity of fluid.

In this respect, the multi shot fluid dispensing system according to the present invention substantially departs from the conventional concepts and designs of the prior art, and in doing so provides an apparatus primarily developed for the purpose of storing a large quantity of fluid, measuring out a precise small quantity of fluid from the large quantity of fluid, and pouring out the precise small quantity of fluid.

Therefore, it can be appreciated that there exists a continuing need for a new and improved multi shot fluid dispensing system which can be used for storing a large quantity of fluid, measuring out a precise small quantity of fluid from the large quantity of fluid, and pouring out the precise small quantity of fluid, the storing and measuring and pouring being done in a safe, convenient and economical manner. The present invention also includes a display panel for the removable receipt and support of a plurality of multi shot fluid dispensing systems. In this regard, the present invention substantially fulfills this need.

SUMMARY OF THE INVENTION

In view of the disadvantages inherent in the known types of fluid dispensing bottles of known designs and configurations now present in the prior art, the present invention provides an improved multi shot fluid dispensing system. As such, the general purpose of the present invention, which will be described subsequently in greater detail, is to provide a new and improved multi shot fluid dispensing system and method which has all the advantages of the prior art and none of the disadvantages.

To attain this, the present invention essentially comprises a multi shot fluid dispensing system with a large bottle having lower, upper and intermediate regions with a cap removably positioned on the upper region. A small bottle has lower, upper and intermediate regions with a cap removably positioned on the upper region. A coupling tube has an upper end operatively coupled to the small bottle at the upper region. A lower end of the coupling tube is operatively coupled to the large bottle at the lower region. A long web attaches the coupling tube to the large bottle. A short web attaches the coupling tube to the small bottle. The bottles, tube and webs are molded of a flexible plastic material.

The present invention also includes a display panel for the removable receipt and support of a plurality of multi shot fluid dispensing systems.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved multi shot fluid dispensing system which has all of the advantages of the prior art fluid dispensing bottles of known designs and configurations and none of the disadvantages.

It is another object of the present invention to provide a new and improved multi shot fluid dispensing system which may be easily and efficiently manufactured and marketed.

It is further object of the present invention to provide a new and improved multi shot fluid dispensing system which is of durable and reliable constructions.

An even further object of the present invention is to provide a new and improved multi shot fluid dispensing system which is susceptible of a low cost of manufacture with regard to both materials and labor, and which accordingly is then susceptible of low prices of sale to the consuming public, thereby making such multi shot fluid dispensing system economically available to the buying public.

Lastly, it is an object of the present invention to provide a new and improved multi shot fluid dispensing system for storing a large quantity of fluid, measuring out a precise small quantity of fluid from the large quantity of fluid, and pouring out the precise small quantity of fluid, the storing and measuring and pouring being done in a safe, convenient and economical manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a multi shot fluid dispensing system constructed in accordance with the principles of the present invention.

FIG. 2 is an exploded front elevational view of the system shown in FIG. 1.

FIG. 3 is a plan view of the system taken along line 3-3 of FIG. 2.

FIG. 4 is a cross sectional view taken along line 4-4 of FIG. 3.

FIG. 5 is a perspective illustration of a multi shot fluid dispensing constructed in accordance with an alternate embodiment of the invention.

FIG. 7A is an enlarged illustration of a portion of a backing showing four tabs, 2 tabs are closed, an upper tab is open and supporting a small bottle and a large bottle, a lower tab is open in anticipation of receiving a small bottle and a large bottle.

The same reference numerals refer to the same parts throughout the various Figures.

DESCRIPTION OF THE PREFERRED EMBODIMENT

Figure 6:
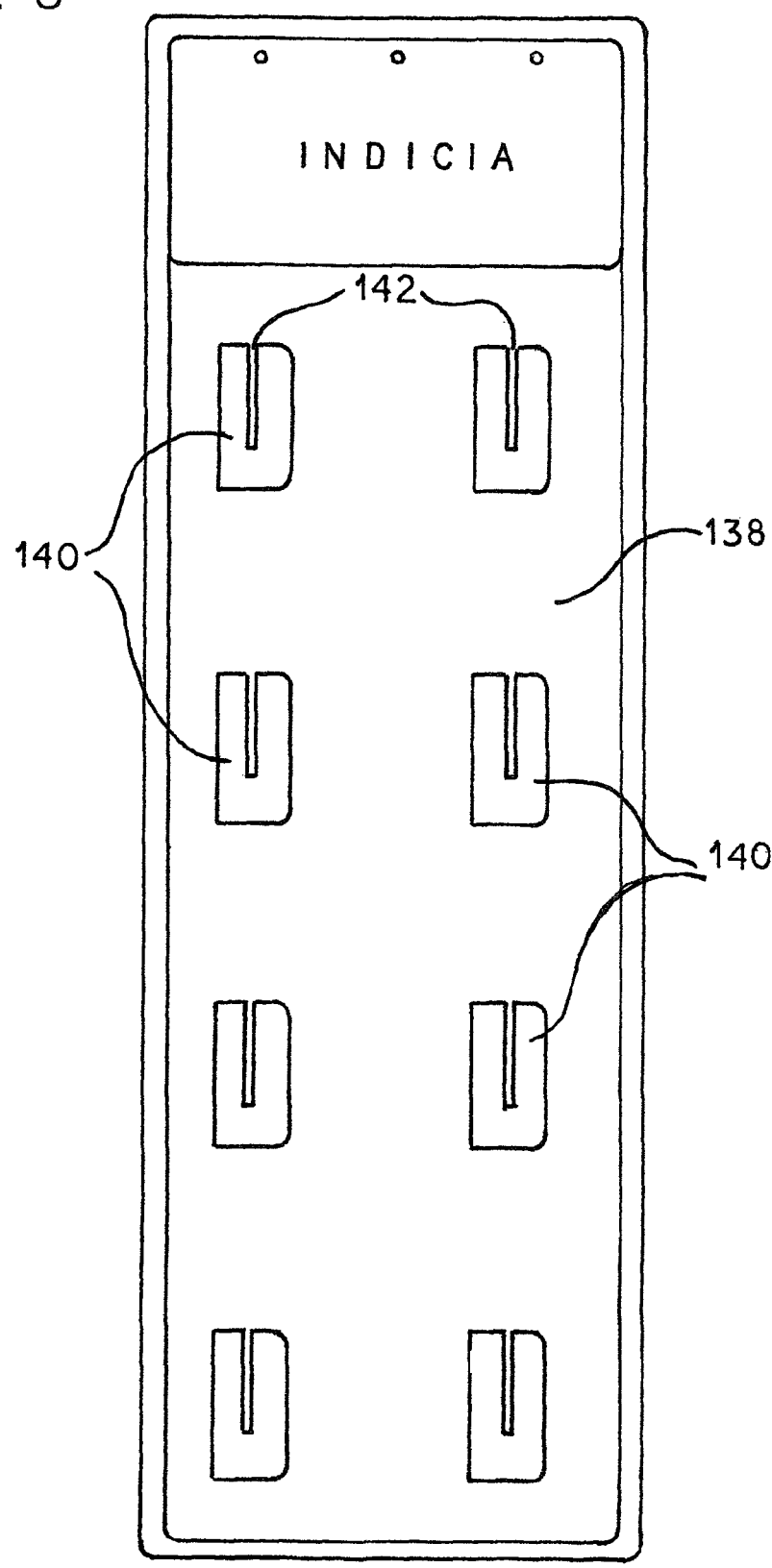
FIG. 6 is a front elevational view of a display panel for removably receiving and supporting a plurality of multi shot fluid dispensing systems.

With reference now to the drawings, and in particular to FIG. 1 thereof, the preferred embodiment of the new and improved multi shot fluid dispensing system embodying the principles and concepts of the present invention and generally designated by the reference numeral 10 will be described.

The present invention, the multi shot fluid dispensing system 10 is comprised of a plurality of components. Such components in their broadest context include a large bottle, a small bottle, a coupling tube, a large web and a small web. Such components are individually configured and correlated with respect to each other so as to attain the desired objective.

The multi shot fluid dispensing system 10 of the present invention is for storing a large quantity of fluid, measuring out a precise small quantity of fluid from the large quantity of fluid, and pouring out the precise small quantity of fluid. The storing and measuring and pouring are done in a safe, convenient and economical manner.

First provided is a large bottle 14. The large bottle has a lower region with a closed bottom end 16 and an upper region with an open top end 18 and an intermediate region with a side wall 20 between the upper and lower regions. The top end is formed with male screw threads 22. An associated threaded cap 24 with female screw threads 26 is removably positioned on the male screw threads for opening and closing the open top end. The male screw threads have a diameter from 0.974 inches to 0.994 inches. The bottom end has a circular base 28 with an inverted frusto-conical section there adjacent. The intermediate region is of a reduced circumference and is located closer to the top end than to the bottom end. The large bottle is of a size to receive and support 33.1 fluid ounces plus or minus 0.3 fluid ounces.

Next provided is a small bottle 34. The small bottle has a lower region with a closed bottom end 36 and an upper region with an open top end 38 and an intermediate region with a side wall 40 between the upper and lower regions. The top end is formed with male screw threads 42. An associated threaded cap 44 with female screw threads 46 is removably positioned on the male screw threads for opening and closing the open top end. The male screw threads have a diameter from 1.068 inches to 1.088 inches. The bottom end has a circular base 48 with an inverted frusto-conical section there adjacent. The side wall has a central region of a reduced circumference located closer to the top end than to the bottom end. The small bottle is of a size to receive and support 1.0 fluid ounces plus or minus 0.1 fluid ounces.

A coupling tube 52 is next provided. The coupling tube has an upper end 54 and a lower end 56. The upper end of the coupling tube is operatively coupled to the small bottle adjacent to the upper end. The lower end of the coupling tube is operatively coupled to the large bottle at the inverted frusto-conical section. The coupling tube has a short convex part 58 above and a long convex part 60 below and a concave part 62 between the short and long convex parts.

Next, a long web 66 is provided. The long web attaches the coupling tube along its concave part and upper and lower convex parts to the upper and lower and intermediate regions of the large bottle. The long web attaches the coupling tube to the large bottle at a fixed first distance.

Lastly, a short web 70 is provided. The short web attaches the coupling tube along its upper convex part to the lower and intermediate regions of the small bottle beneath the upper region of the small bottle. The short web attaches the coupling tube to the small bottle at a fixed second distance greater than the first fixed distance. The long and short webs are in a common vertical plane. The tops of the large and small bottles are at a common elevation. The bottom of the small bottle is at an elevation the same as the intermediate region of the large bottle. The large bottle, the small bottle, the coupling tube, the long web, and the short web are molded of high density polyethylene with limited flexibility. In this manner, squeezing the large bottle while the caps are on the bottles will pump fluid from the large bottle through the coupling tube to the small bottle for filling the small bottle with excess fluid returning by gravity through the coupling tube.

Figure 7:
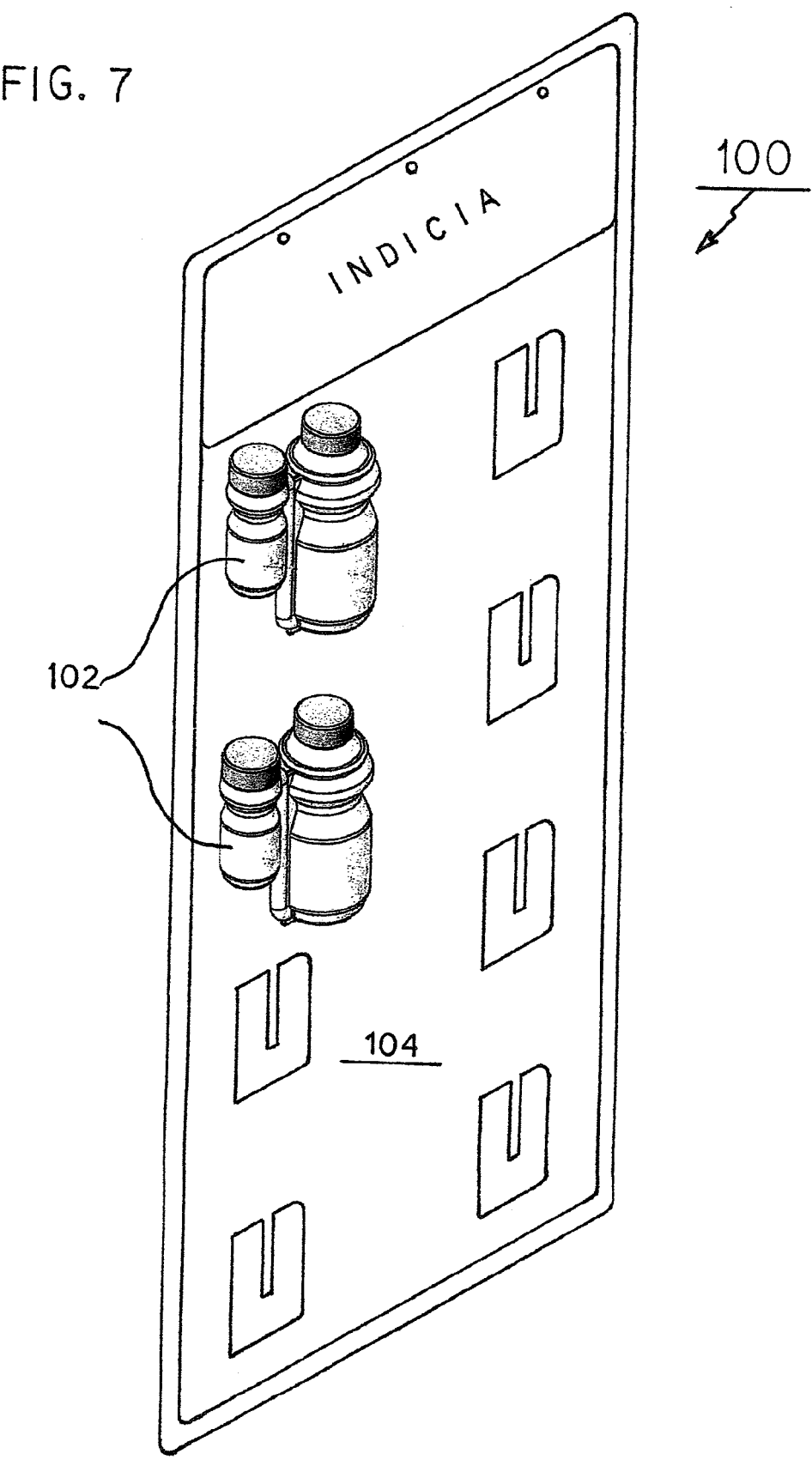
FIG. 7 is a perspective illustration of a display panel removably receiving and supporting a plurality of multi shot fluid dispensing systems.

An alternate embodiment of the invention is illustrated in FIGS. 5 through 7. Such alternate embodiment is an assembly 100 of a plurality of multi shot fluid dispensing systems 102 and a display panel 104. The display panel is for removably receiving and supporting the plurality of multi shot fluid dispensing systems.

One multi shot fluid dispensing system, the first component of the assembly, is illustrated in FIGS. 5 and 7. Such multi shot fluid dispensing system includes a large bottle 106 and a small bottle 108. The large bottle, preferably with a 5.5 ounces capacity, has a lower region 110, an upper region 112, and an intermediate region 114. A cap 116 is threadedly positioned on the upper region. The small bottle, preferably with a 1.0 ounce capacity, has a lower region 118, an upper region 120 and intermediate region 122. A cap 124 is threadedly positioned on the upper region.

Each large bottle has a common axial length and maximum diameter. Each small bottle has a common axial length and maximum diameter. The axial length and maximum diameter of the large bottles are greater than the axial length and maximum diameter of the small bottles.

Each multi shot fluid dispensing system includes a coupling tube 128. Each coupling tube is formed with an upper end and a lower end. The upper end is operatively coupled to the small bottle at the upper region. The lower end is operatively coupled to the large bottle at the lower region. The large and small bottles are laterally spaced from each other.

A long web 132 attaches the coupling tube to the large bottle. A short web 134 attaches the coupling tube to the small bottle. The bottles and tube and webs of each multi shot fluid dispensing system are molded of a flexible plastic material.

Operation of the system involves squeezing the large bottle with the lid of the large bottle covering the large bottle and with the lid of the small bottle removed. Efficiency is increased due to the generally cylindrical configuration of the bottles in combination with the lateral spacing between the small and large bottles.

The second component of the assembly is the display panel 104. The display panel functions for removably receiving and supporting a plurality of multi shot fluid dispensing systems. Each multi shot fluid dispensing system is adapted to be viewed by potential customers, removed from the panel and purchased for subsequent drinking. The display panel is formed of a cardboard material with a planar backing 138 in a rectangular configuration and with plurality of C-shaped cuts forming tabs 140. Each tab has a top and a bottom and a pivotable interior edge and a parallel free edge. Each tab if formed with a vertical slit 142 intermediate of and parallel with the interior and exterior edges. Each slit extends from the top edge of the tab and terminates above the bottom edge of the tab. Each slot has a length to receive the short web. The space between a slit and its adjacent interior edge is between 45 percent and 55 percent of the maximum diameter of the large bottle to facilitate convenient support and removal.

The panel has an upper section above the tabs and above the supported bottles. Such panel is adapted to include educational indicia as to the contents of the bottles and the method of using the contents. Furthermore, advertising indicia is adapted to be included relating to the cost of the bottles and their contents.

FIG. 7 is a perspective illustration of a display panel removably receiving and supporting a plurality of multi shot fluid dispensing systems. The disclosed embodiment shows two rows of tabs with a plurality of tabs in each row. It should be understood that one row, or any number of rows, may be formed on a backing sheet. Furthermore, any number of tabs may be formed be in each row.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fluid dispensing assembly comprising:
   a large bottle having a lower region, an upper region, and an intermediate region with a cap removably positioned on the upper region;
   a small bottle having a lower region, an upper region, and an intermediate region with a cap removably positioned on the upper region;
   a coupling tube having an upper end and a lower end, the upper end being operatively coupled to the small bottle at the upper region, the lower end being operatively coupled to the large bottle at the lower region;
   a long web attaching the coupling tube to the large bottle;
   a short web attaching the coupling tube to the small bottle; and
   a display panel removably receiving and supporting a plurality of large and small bottles, the display panel being formed with a planar backing (138) and with plurality of C-shaped cuts forming tabs (140), each tab having a top edge (144) and a bottom edge (146) and a pivotable interior edge (148) and a parallel free edge (150), each tab being formed with a linear vertical slit intermediate of and parallel with the interior edge and the exterior edge, each slit (142) extending from the top of the tab and terminating above the bottom of the tab with a length receiving the short web and wherein the small bottle is laterally spaced from the large bottle and with the small web positioned in an associated slot, and with the small bottle and the large bottle on opposite sides of the tab.

2. The assembly as set forth in claim 1 wherein the large bottle has a length and a maximum diameter and wherein the distance between the slit and an associated interior edge is between 45 percent and 55 percent of the maximum diameter of the large bottle.

* * * * *